US012032711B2

(12) United States Patent
Lansel (10) Patent No.: US 12,032,711 B2
(45) Date of Patent: Jul. 9, 2024

(54) SYSTEM AND METHOD FOR CONTROLLING CONFIDENTIAL INFORMATION

(71) Applicant: OLYMPUS CORPORATION, Hachioji (JP)

(72) Inventor: Steven Paul Lansel, East Palo Alto, CA (US)

(73) Assignee: OLYMPUS CORPORATION, Tokyo (JP)

( * ) Notice: Subject to any disclaimer, the term of this patent is extended or adjusted under 35 U.S.C. 154(b) by 835 days.

(21) Appl. No.: 17/161,339

(22) Filed: Jan. 28, 2021

(65) Prior Publication Data

US 2021/0150358 A1    May 20, 2021

Related U.S. Application Data

(63) Continuation of application No. PCT/US2018/062796, filed on Nov. 28, 2018.

(51) Int. Cl.
*G06F 21/62*    (2013.01)
*G06F 16/901*    (2019.01)
(Continued)

(52) U.S. Cl.
CPC ...... *G06F 21/6218* (2013.01); *G06F 16/9014* (2019.01); *G06F 18/214* (2023.01);
(Continued)

(58) Field of Classification Search
CPC ............. G06F 21/6218; G06F 16/9014; G06F 18/214; G06F 18/217; G06F 2221/2141;
(Continued)

(56) References Cited

U.S. PATENT DOCUMENTS

2016/0179660 A1    6/2016 Young et al.
2017/0212829 A1    7/2017 Bales et al.
(Continued)

OTHER PUBLICATIONS

Mahdavinejad et al., NPL—("Machine learning for internet of things data analysis: a survey" Published 2017 [hereinafter"Mahdavinejad"] Total 175 pages (Year: 2017).*

(Continued)

*Primary Examiner* — Quoc A Tran
(74) *Attorney, Agent, or Firm* — Holtz, Holtz & Volek PC (57) ABSTRACT

A method for evaluating an external machine learning program while limiting access to internal training data includes providing labeled training data from a first source, receiving, by the first source, a machine learning program from a second source different from the first source, blocking, by the first source, access by the second source to the labeled training data, and training, by the first source, the machine learning program according to a supervised machine learning process using the labeled training data. The method further includes generating a first set of metrics from the supervised machine learning process that provide feedback about training of the neural network model, analyzing the first set of metrics to identify subset data therein, and, in order to permit evaluation of the neural network model, transmitting, to the second source, those metrics from the first set of metrics that do not include the subset data.

25 Claims, 4 Drawing Sheets

(51) Int. Cl.
*G06F 18/21* (2023.01)
*G06F 18/214* (2023.01)
*G06N 3/08* (2023.01)

(52) U.S. Cl.
CPC ............ *G06F 18/217* (2023.01); *G06N 3/08* (2013.01); *G06F 21/6245* (2013.01); *G06F 2221/2141* (2013.01)

(58) Field of Classification Search
CPC ........ G06F 2221/2149; G06F 21/6245; G06N 3/08
See application file for complete search history.

(56) References Cited

U.S. PATENT DOCUMENTS

| | | |
|---|---|---|
| 2018/0240017 A1 | 8/2018 | Huszar et al. |
| 2018/0240031 A1 | 8/2018 | Huszar et al. |
| 2019/0147350 A1* | 5/2019 | Bai .......................... G06N 3/08 706/25 |
| 2020/0125928 A1* | 4/2020 | Doyle .............. G06V 30/19147 |

OTHER PUBLICATIONS

International Search Report (ISR) dated Aug. 1, 2019 issued in International Application No. PCT/US2018/062796.
Written Opinion dated Aug. 1, 2019 issued in International Application No. PCT/US2018/062796.
International Preliminary Report on Patentability (IPRP) and Written Opinion dated May 25, 2021 issued in International Application No. PCT/US2018/062796.

* cited by examiner

SYSTEM AND METHOD FOR CONTROLLING CONFIDENTIAL INFORMATION

TECHNICAL FIELD

Embodiments of the present disclosure relate generally to controlling access to data and more particularly to controlling access to data when generating metrics associated with a machine learning (e.g. neural network model).

BACKGROUND

As data-driven computing applications continue to proliferate, controlling access to digital information (e.g., to prevent disclosure to unauthorized parties) is becoming an increasingly important technical challenge. This challenge is particularly acute when using program code to analyze or otherwise perform tasks based on access-controlled data (e.g., data containing confidential information). The behavior of program code when executed may be complex, difficult to control, unpredictable, and/or the like. Accordingly, there is an elevated risk of accidental (and/or malicious) disclosure of confidential information when operating on the data using program code.

U.S. Patent Publication No. 2016/0179660, filed Dec. 17, 2014, entitled "Securing Secret Information in Source Code Verification and at Runtime," describes a method of controlling confidential information by verifying through examination that source code protects confidential information. The method contains a type of variable that contains confidential information called a secret type. Source code is examined to ensure that whenever a secret variable is used in a command, any modified or output variables are also of secret type. If instead the source code contains a command where the modified or output variables are not of secret type when a secret variable is input, an exception is created in the source code verification process. Through this process, source code is only verified if all variables or data generated using confidential information are also classified as confidential. Although this method provides strong protection for confidential information once designated as a secret type, it may be overly restrictive in applications in which it is desirable to share certain data derived from confidential information, which may not itself be confidential.

Accordingly, it is desirable to develop improved systems and methods for controlling access to data. It is desirable to develop systems and methods that allow certain data derived from confidential information to be shared while protecting against disclosure of the confidential information itself.

BRIEF DESCRIPTION OF THE DRAWINGS

These and other aspects and features of the present disclosure will become apparent to those ordinarily skilled in the art upon review of the following description of specific embodiments in conjunction with the accompanying figures, wherein.

DETAILED DESCRIPTION

Machine learning, c.f. neural network models have demonstrated great promise as a technique for automatically analyzing real-world information with human-like accuracy. In general, machine learning receives input information and make predictions based on the input information. For example, a neural network classifier may predict a class of the input information among a predetermined set of classes. Neural network models have been shown to outperform and/or have the potential to outperform other computing techniques in a number of applications. Indeed, some applications have even been identified in which neural networking models exceed human-level performance. Examples of applications for neural network models include image recognition, speech recognition, natural language processing, medical diagnostics, robotics, and/or the like.

A neural network model may include a plurality of neural network layers arranged sequentially (e.g., in a pipelined manner). Examples of neural network layers include densely connected layers, convolutional layers, recurrent layers, pooling layers, dropout layers, and/or the like. In some examples, a neural network model may include at least one hidden layer that is not directly connected to either an input or an output of the neural network. Whereas other approaches to analyzing real-world information may involve hard-coded processes, statistical analysis, and/or the like, neural network models learn to make predictions gradually, by a process of trial and error, using a machine learning process. In particular, the neural network model (and/or its constituent layers) may include a plurality of model parameters (e.g., weights and/or biases) that are learned according to the machine learning process. Examples of machine learning processes include supervised learning, reinforcement learning, unsupervised learning, and/or the like.

During a supervised learning process, the neural network model may be trained using labeled data that includes a large number of training examples and corresponding training labels. At each training step, the neural network model is evaluated based on the training examples, and the parameters of the neural network model are updated based on the training labels (e.g., using optimization techniques such as back propagation). The supervised learning process may proceed iteratively until the neural network model begins to consistently make similar inferences from the training examples that a human might make. Throughout the machine learning process, various training metrics may be generated to provide a developer of the neural network model with feedback associated with the supervised learning process. For example, an accuracy metric may be generated to inform the developer of how accurately the model performed at a given training step. Similarly, during the supervised learning process and/or after the supervised learning process is complete the neural network model may be tested using test data, and various testing metrics (e.g., testing accuracy) may be generated.

Neural network models may have a wide variety of designs and/or architectures. Accordingly, it may be desirable to test a large number of types and/or variants of neural network models for a given set of labeled data, e.g., using a trial-and-error approach. In this regard, an entity that seeks to obtain a neural network model that performs well on a given labeled data set may enlist the help of third parties to design and test candidate models. For example, the entity may lack internal developer resources and/or expertise to develop a sufficient number and/or caliber of candidate models. Accordingly, the entity may allow third parties to train and/or test candidate neural network models using the labeled data set, e.g., by organizing a competition. At the same time, the entity may desire to maintain exclusive access to the labeled data set and/or the trained parameters of the candidate models.

Consequently, the entity may desire to provide third parties with access to some types of data associated with training and/or testing models (e.g., to provide sufficient feedback to allow the third parties to develop and/or improve their models), but may desire to prevent the third parties from accessing other types of data (e.g., the underlying labeled data set and/or the trained parameters of the models). In this regard, the method for protecting confidential information discussed in the Background may be too restrictive to use in supervised learning applications. In particular, the method may deem all or most data related to training and/or testing neural network models to be secret when the labeled data set is identified as being secret. As a result, the method may not accommodate the desire to provide sufficient feedback associated with training and/or testing to the third-party developers. Accordingly, it is desirable to develop improved techniques for controlling access to data in supervised learning applications.

Figure 1:
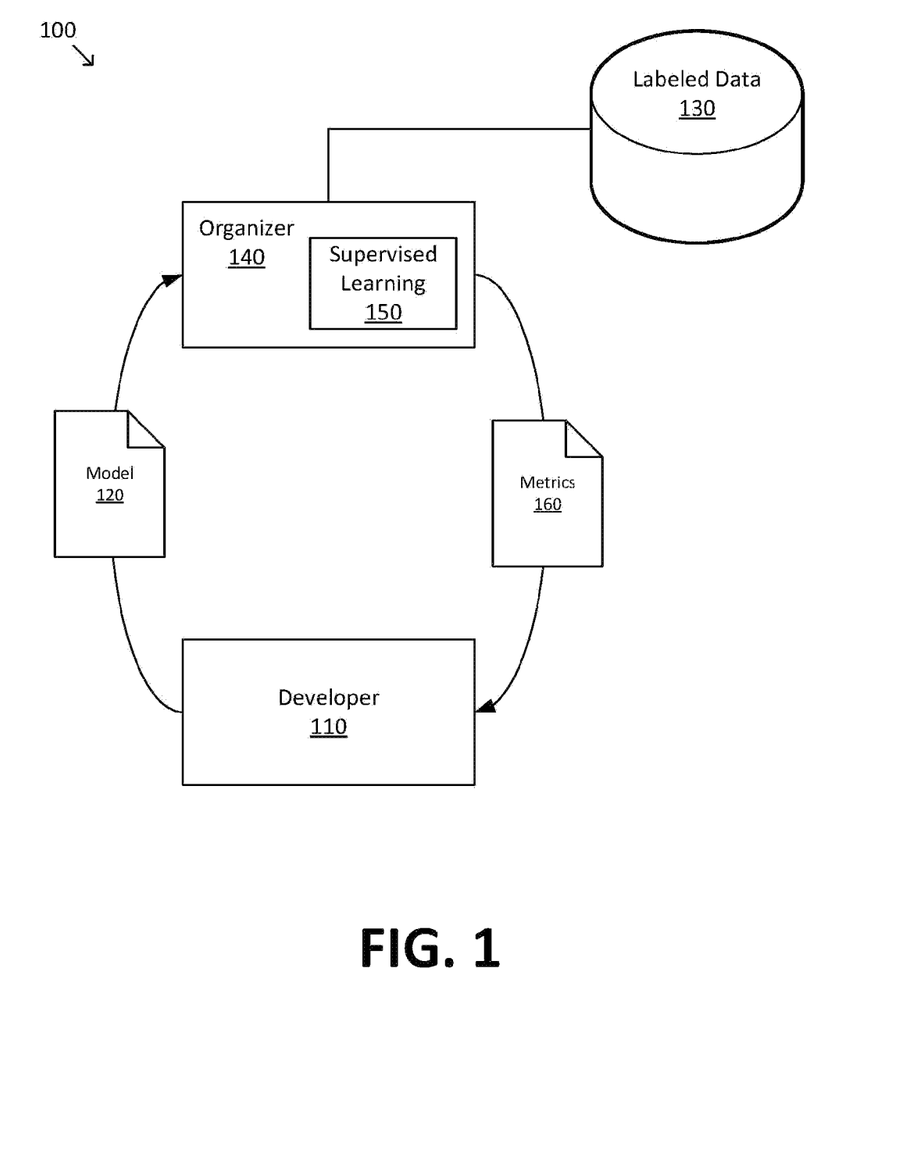
FIG. 1 is a simplified diagram of a system for controlling access to data according to some embodiments.

FIG. 1 is a simplified diagram of a system 100 for controlling access to data according to some embodiments. According to some embodiments, system 100 may allow a developer entity 110 to train and/or test a model 120 using labeled data 130 associated with an organizer entity 140 without providing access by the developer entity 110 to the labeled data 130. In some embodiments, model 120 may correspond to a neural network model developed by developer entity 110. Consistent with such embodiments, the organizer entity 140 as a first source (which may also be referred to as an operator or operator entity) may operate a supervised learning module 150 for training and/or testing model 120 using labeled data 130 that is generally provided by the organizer entity 140. In this regard, organizer entity 140 as a first source may correspond to an individual, group, organization, and/or the like that owns labeled data 130 and/or is otherwise capable of accessing and/or using labeled data 130 for supervised learning applications. In any event, the developer entity 110 as a second source is generally prevented from accessing the labeled data 130 and/or supervised learning module 150. It is to be understood that ownership of and/or access to labeled data 130 does not imply ownership of particular hardware and/or software components of system 100. For example, various hardware and/or software components associated with labeled data 130 and/or supervised learning module 150 may be implemented using third party cloud-based services.

The configuration of system 100, where organizer entity 140 as the first source provides computing resources (e.g., labeled data 130 and/or supervised learning module 150) to train and/or test model 120, may offer improved efficiency relative to prior art systems in which a developer entity 110 provides the computing resources to train and/or test model 120. For example, when developer entity 110 and organizer entity 140 communicate via a network, system 100 may reduce network bandwidth consumption because labeled data 130 may not be transmitted over the network to developer entity 110. In some embodiments, organizer entity 140 may provide access to supervised learning module 150 to a plurality of developers, such as developer entity 110. Consistent with such embodiments, system 100 may increase utilization of computing resources and/or reduce redundancies by centralizing the training and/or testing of neural network models, such as model 120, submitted by the plurality of developers.

In general, labeled data 130 may include virtually any type of data usable as an input for model 120 and corresponding labels. In some examples, when model 120 corresponds to an image recognition model, labeled data 130 may include a set of images with labels that identify objects appearing in the images. In some examples, when the model 120 corresponds to a sequence-to-sequence prediction model (e.g., a machine translation model), labeled data 130 may include a set of input sequences (e.g., text sequences in a source language) and a corresponding set of output sequences (e.g., translated text sequences in a target language). In some examples, when model 120 is used for medical diagnostics and/or disease identification applications, labeled data 130 may include a set of patient observations (e.g., medical test results and/or medical images) and a corresponding set of diagnoses.

Based on labeled data 130, supervised learning module 150 may train and/or test model 120 using a supervised learning process. During training and/or testing of model 120, supervised learning module 150 may generate a set of metrics 160 (e.g., training and/or testing metrics) that are sent to developer entity 110 to provide feedback associated with the training and/or testing of model 120. Based on the set of metrics 160, developer entity 110 may iteratively modify model 120 in an effort to improve the performance of model 120. In general, the type of metrics 160 may vary depending on the type of model 120 being trained and/or tested. For example, a set of metrics 160 may include accuracy metrics, such as character or word accuracy (in the case of audio transcription models, machine translation models, and/or the like), sensitivity, specificity, F1 score, mean squared error, and/or the like. In some examples, a set of metrics 160 may include parameter metrics associated with the parameters of model 120, such as weights, biases, aggregate statistics associated with the parameters (e.g., mean and/or variance), and/or the like. In some examples, a set of metrics 160 may include performance metrics, such as latency, processor usage, memory usage, and/or the like. In some examples, a set of metrics 160 may include embeddings (e.g., mappings between input values and real-valued vectors at various layers of model 120). In some examples, a set of metrics 160 may include output streams associated with supervised learning module 150, such as the standard output stream ("stdout"), the standard error stream ("stderr"), and/or the like.

In some embodiments, organizer entity 140 as the first source may seek to control, limit or otherwise block access by the developer entity 110 to labeled data 130 when training and/or testing model 120. For example, organizer entity 140 may seek to prevent a subset of data associated with labeled data 130 (e.g., labeled data 130 itself, information that may be used to derive labeled data 130, trained parameters of model 120 after being trained using labeled data 130, and/or the like) from being accessed by developer entity 110. In particular, organizer entity 140 may seek to prevent such subset data from being included in the set of metrics 160 that are sent to developer entity 110.

In general, there are a variety of reasons that organizer entity 140 may seek to control access to labeled data 130. In some embodiments, organizer entity 140 may seek to control access to labeled data 130 because labeled data 130 may be economically valuable. For example, the process of collecting, curating, labeling, accessing, and/or maintaining labeled data 130 may be costly, laborious, time-intensive, and/or the like. Accordingly, controlling access to labeled data 130 may serve to protect an investment that organizer entity 140 made in obtaining labeled data 130.

In some embodiments, organizer entity 140 may seek to control access to labeled data 130 because labeled data 130 may include private information. For example, labeled data 130 may include personal information (e.g., financial information, health information, geolocation information, and/or the like) that is subject to compliance with privacy regulations, industry standards, consumer expectations, non-disclosure agreements, and/or the like. Accordingly, controlling access to labeled data 130 may serve to satisfy privacy-related obligations of organizer entity 140.

In some embodiments, organizer entity 140 may seek to control access to labeled data 130 in order to maintain the integrity of a competition. For example, organizer entity 140 may run a competition in which a plurality of developers, such as developer entity 110, compete with one another to develop the best (e.g., most accurate) model. During the competition, developers with direct access to labeled data 130 may have a competitive advantage over those without access. Accordingly, organizer entity 140 may seek to control access to labeled data 130 to prevent competitors from gaining an unfair advantage in the competition.

Accordingly, it would be desirable for system 100 to provide organizer entity 140 with the ability to control access to labeled data 130. In particular, it would be desirable for organizer entity 140 to prevent and/or limit the ability of developer entity 110 to receive subset data associated with labeled data 130 in a set of metrics 160 transmitted to the developer entity 110.

Figure 2:
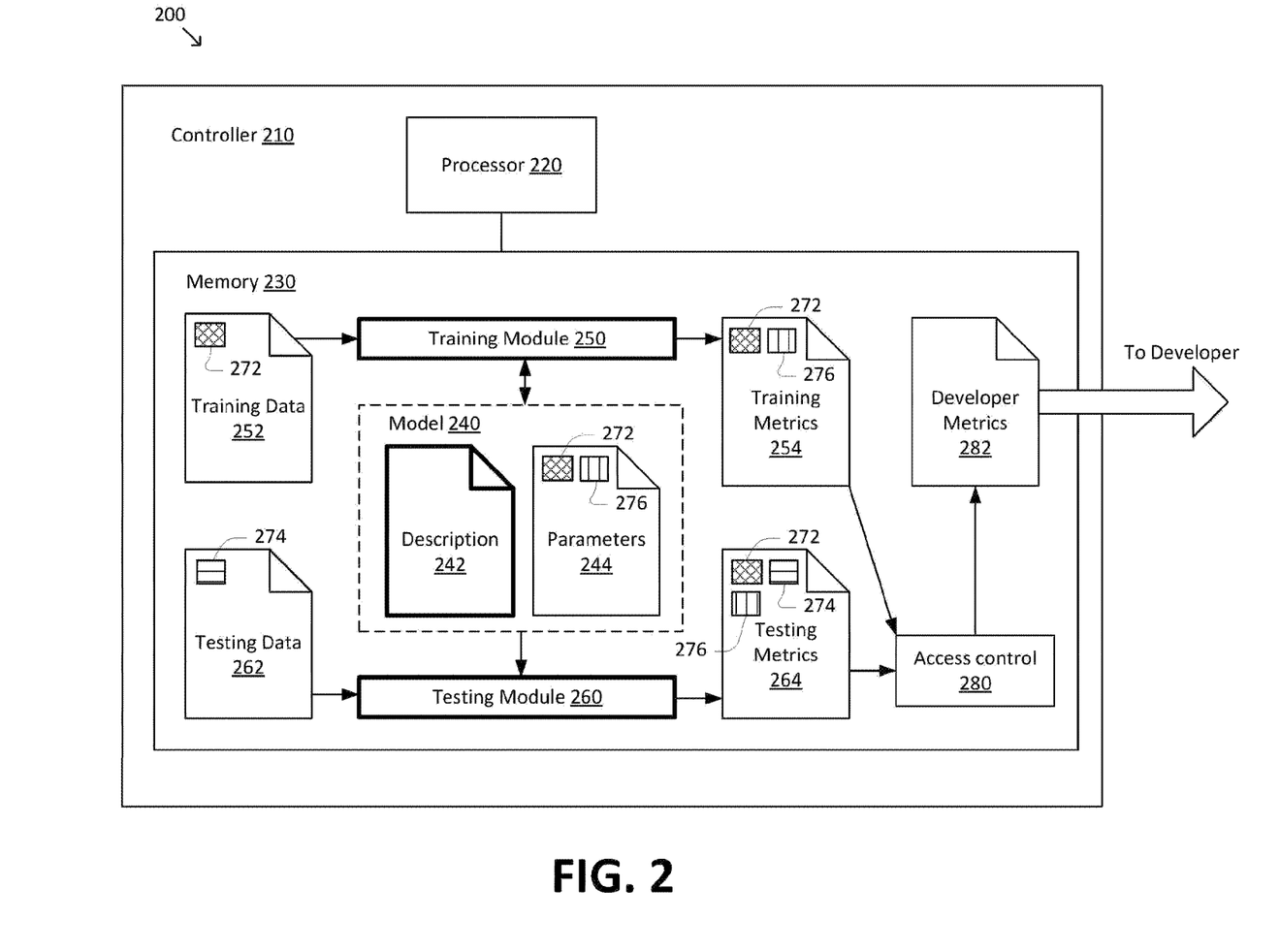
FIG. 2 is a simplified diagram of a supervised learning system for training and/or testing machine learning according to some embodiments.

FIG. 2 is a simplified diagram of a supervised learning system 200 for training and/or testing a neural network model according to some embodiments. According to some embodiments consistent with FIG. 1, supervised learning system 200 may be used to implement learning module 150 of system 100.

As depicted in FIG. 2, supervised learning system 200 includes a controller 210. In some embodiments, controller 210 may include a processor 220 (e.g., one or more hardware processors). Although processor 220 may include one or more general purpose central processing units (CPUs), processor 220 may additionally or alternately include at least one processor that provides accelerated performance when testing and/or training neural network models. For example, processor 220 may include a graphics processing unit (GPU), an application specific integrated circuit (ASIC), a field programmable gate array (FPGA), a tensor processing unit (TPU), a digital signal processor (DSP), a single-instruction multiple-data (SIMD) processor, and/or the like. Generally, such processors may accelerate various computing tasks associated with evaluating neural network models (e.g., training, testing, prediction, preprocessing, and/or the like) by an order of magnitude or more in comparison to a general purpose CPU.

Controller 210 may further include a memory 230 (e.g., one or more non-transitory memories). Memory 230 may include various types of short-term and/or long-term storage modules including cache memory, static random access memory (SRAM), dynamic random access memory (DRAM), non-volatile memory (NVM), flash memory, solid state drives (SSD), hard disk drives (HDD), optical storage media, magnetic tape, and/or the like. In some embodiments, memory 230 may store instructions that are executable by processor 220 to cause processor 220 to perform operations corresponding to processes disclosed herein and described in more detail below.

Processor 220 and/or memory 230 may be arranged in any suitable physical arrangement. In some embodiments, processor 220 and/or memory 230 may be implemented on a same board, in a same package (e.g., system-in-package), on a same chip (e.g., system-on-chip), and/or the like. In some embodiments, processor 220 and/or memory 230 may correspond to distributed, virtualized, and/or containerized computing resources. Consistent with such embodiments, processor 220 and/or memory 230 may be located in one or more data centers and/or cloud computing facilities. In some embodiments consistent with FIG. 2, processor 220 and/or memory 230 may be subject to physical and/or digital security measures to prevent unauthorized entities (e.g., developer entity 110) from accessing data associated with processor 220 and/or memory 230. For example, processor 220 and/or memory 230 may be located on secured premises of an organizer entity, such as organizer entity 140, an affiliate of the organizer entity, a cloud service provider associated with the organizer entity, and/or the like. Similarly, access to processor 220 and/or memory 230 may be protected using digital techniques including encrypted storage, encrypted communication (e.g., secure socket layer (SSL) communication), user authentication (e.g., multi-factor authentication (MFA)), and/or the like.

In some embodiments, memory 230 may store a model 240 that is evaluated and/or updated by processor 220 during supervised learning. According to some embodiments consistent with FIG. 1, model 240 may be the model 120 of system 100 provided by developer entity 110 for training and/or evaluation. Model 240 may be stored in memory 230 using any number of files and/or data structures. As depicted in FIG. 2, model 240 includes a file containing a model description 242 that defines a computational graph of model 240 (e.g., a sequence of neural network layers) and a file containing model parameters 244 that stores parameters of model 240 (e.g., weights and/or biases). In general, model description 242 and/or model parameters 244 may be stored in any suitable format, including but not limited to structured, unstructured, serialized, and/or database formats.

In some embodiments, memory 230 may store a training module 250 that includes instructions for training model 240 using a supervised learning process. Similarly, memory 230 may store a testing module 260 that includes instructions for testing model 240 before, during, and/or after the supervised learning process. In some embodiments, training module 250 and/or testing module 260 may access labeled training data 252 and/or labeled testing data 262, respectively, during training and/or testing. In embodiments consistent with FIG. 1, labeled training data 252 and/or labeled testing data 262 may generally correspond to labeled data 130. Labeled training data 252 and/or labeled testing data 262 may be stored locally by supervised learning system 200, retrieved from a remote data store, and/or the like. In some embodiments, training module 250 may generate training metrics 254 that provide feedback associated with the training of model 240. Similarly, testing module 260 may generate testing metrics 264 to provide feedback associated with the testing of model 240. In embodiments consistent with FIG. 1, training metrics 254 and/or testing metrics 264 may generally correspond to metrics 160.

In some embodiments, an operator of supervised learning system 200, such as organizer entity 140 as a first source, may allow third party developers, such as developer entity 110 as a second source, to provide, customize, and/or otherwise configure various aspects of supervised learning system 200. For example, supervised learning system 200 may provide a cloud-based service for training and/or testing neural network models that is accessible by third party developers. As illustratively shown in FIG. 2, referring to the bold outlined portions, the third party developers may configure model description 242, training module 250, and testing module 260. That is, a developer entity 110 may define a sequence of neural network layers that make up model 240 and/or may provide instructions for training and/or testing model 240. Likewise, in some embodiments, the developer entity 110 may select initial values for the parameters of model 240. In some examples, the developer-configurable portions of supervised learning system 200 (e.g., model description 242, training module 250, and/or testing module 260) may be uploaded to supervised learning system 200 by the developer entity 110, configured by the developer via a web interface, and/or the like.

In some embodiments, a developer entity 110 may be able to customize training metrics 254 and/or testing metrics 264 (e.g., by configuring training module 250 and/or testing module 260 to generate customized metrics) generated from the training and/or testing of model 240. In general, allowing third party developer entities to customize training metrics 254 and/or testing metrics 264 may increase the richness and/or effectiveness of the feedback they receive associated with model 240. By contrast, providing a rigid specification for generating training metrics 254 and/or testing metrics 264 that prevents and/or limits customization may impose limitations on the ability of the third party developers to receive adequate feedback. For example, third party developers may seek to train model 240 using a wide range of supervised learning techniques, each of which may be associated with various types of training metrics 254. Similarly, third party developers may define new and/or unusual metrics, which may not be known and/or deemed sufficiently As discussed previously, the organizer entity of supervised learning system 200 may desire to control access to data by one or more third party developer entities during the supervised learning process. As depicted in FIG. 2, the subset data that the operator seeks to control may include subset data 272 associated with labeled training data 252, subset data 274 associated with labeled testing data 262, subset data 276 associated with model parameters 244, and/or the like. In some other embodiments, subset data 272 may include labeled training data 252 itself and/or portions thereof, information usable to derive labeled training data 252, information usable to produce equivalent training results to labeled training data 252 (e.g., information that can be used to learn substantially the same parameters as model parameters 244), metadata associated with labeled training data 252, and/or the like. Likewise, subset data 274 may include labeled testing data 262 itself and/or portions thereof, information usable to derive labeled testing data 262, metadata associated with labeled testing data 262, and/or the like. Similarly, subset data 276 may include labeled model parameters 244 themselves and/or portions thereof, information usable to derive model parameters 244, metadata associated with model parameters 244, and/or the like.

As illustrated in FIG. 2, various types of subset data 272-276 may be included in a set of training metrics 254 and/or testing metrics 264 during training and/or testing, in some other embodiments. For example, subset data 272 associated with labeled training data 252 and/or subset data 276 associated with model parameters 244 may be included in training metrics 254. Similarly, subset data 274 associated with labeled testing data 262 and/or subset data 276 associated with model parameters 244 may be included in a set of testing metrics 264.

In some other embodiments, subset data 272 associated with labeled training data 252 may be included in a set of testing metrics 264 via model parameters 244. That is, during training, training module 250 may iteratively update model parameters 244 based on labeled training data 252. As a result, subset data 272 associated with labeled training data 252 may be incorporated into model parameters 244. Accordingly, to the extent that aspects of model parameters 244 may be included in a set of testing metrics 264, subset data 272 may also be included in a set of testing metrics 264. To illustrate, suppose subset data 272 includes images and model parameters 244 include trainable convolutional filters of a convolutional neural network layer. During training, the convolutional filters may learn certain features associated with the images (e.g., when the images depict faces, the convolutional filters may learn to detect features such as eyes, noses, and mouths). In these examples, the learned features may constitute subset data 272 in that they may allow the developer to determine the content of the images (e.g., when a convolutional filter is trained to recognize a facial feature such as a nose, it becomes clear that labeled training data 252 includes images of faces).

To prevent and/or limit subset data 272-276 from reaching the third party developers, memory 230 may store an access control module 280 that includes instructions for detecting whether a set of training metrics 254 and/or testing metrics 264 include subset data 272-276. In some embodiments, access control module 280 may operate proactively and/or retroactively. For example, when operating proactively, access control module 280 may analyze training module 250 and/or testing module 260 to determine whether they instruct subset data 272-276 to be included in training metrics 254 and/or testing metrics 264, a process that may occur prior to training metrics 254 and/or testing metrics 264 being generated. When operating retroactively, access control module 280 may analyze training metrics 254 and/or testing metrics 264 after they are generated to determine whether they include subset data 272-276.

In response to a determination that a first set of training metrics 254 and/or testing metrics 264 include subset data 272-276, access control module 280 may perform one or more remedial actions. In some embodiments, the remedial actions may include preventing the first set of training metrics 254 and/or testing metrics 264 from being transmitted to the developer entity. In some embodiments, the remedial actions may include transmitting an error message to the developer entity and/or to the organizer entity of supervised learning system 200. In some embodiments, the remedial actions may include automatically generating a second set of metrics 282 that do not include (and/or included a limited amount of) subset data 272-276 and sending this second set of metrics 282 to the third party developer entity.

Figure 3:
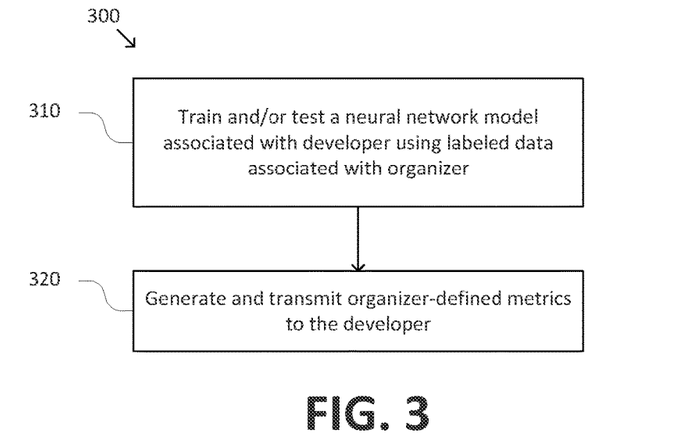
FIG. 3 is a simplified diagram of a method for controlling access to data using organizer-defined metrics according to some embodiments.

FIG. 3 is a simplified diagram of a method 300 for controlling access to data using a set of metrics defined or otherwise selected by the organizer entity, which metrics may be referred to herein as "organizer-defined metrics" according to some embodiments. In some embodiments consistent with FIGS. 1-2, method 300 may be performed using a supervised learning system, such as supervised learning system 200.

At a process 310, a neural network model, such as models 120 and/or 240, associated with a third party developer, such as developer entity 110 as a second source, is trained and/or tested using labeled data, such as labeled data 130, 252, and/or 262, associated with an organizer and/or operator, such as organizer entity 140 as a first source. For example, the training may be performed using supervised learning techniques. In some embodiments, the neural network model may be developed by the third party developer entity and provided to the organizer entity as part of a competition, an outsourcing arrangement, and/or the like. In some embodiments, the organizer entity may be an owner of the labeled data and/or may desire to control access to the subset data, such as subset data 272, 274, and/or 276, associated with the labeled data and/or the trained model parameters by the third party developer. At the same time, the organizer entity may desire to provide, and the third party developer entity may desire to receive, certain metrics associated with training and/or testing the neural network model, which metrics may assist the developer entity in an evaluation and/or revising of the neural network model.

At a process 320, one or more organizer-defined (and/or organizer-selected) sets of metrics associated with the training and/or testing are generated and sent to the third party developer as developer metrics, such as developer metrics 282. In some embodiments, the organizer-defined metrics may be generated using instructions provided by the organizer, thereby providing the organizer with control of the contents of the organizer-defined metrics. For example, the organizer may define the organizer-defined metrics such that the developer metrics do not include (and/or include a limited amount of) subset data. In some embodiments, the third party developer entity may configure the process training and/or testing the neural network model. Consistent with such embodiments, the third party developer entity may select among the organizer-defined metrics and determine when they are generated, but may be prevented from modifying the organizer-defined metrics so as to include subset data. In illustrative embodiments, the organizer entity may provide an application programmer interface (API) for the third party developer entity to invoke the organizer-defined metrics during testing and/or training.

Figure 4:
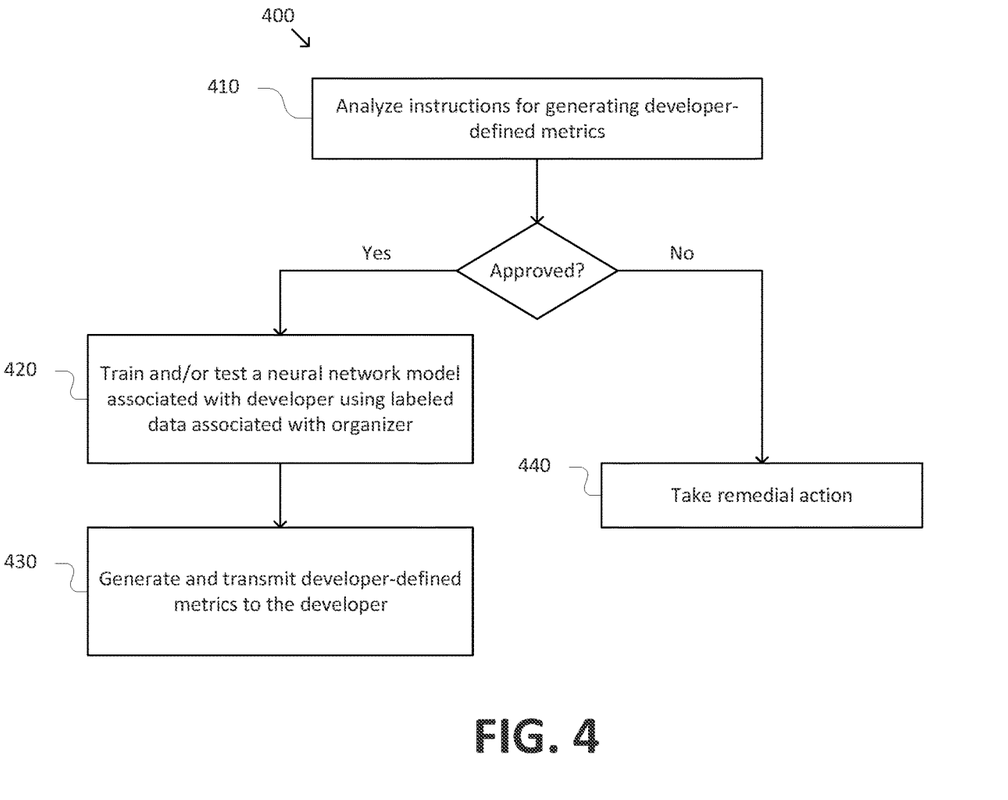
FIG. 4 is a simplified diagram of a method for controlling access to data using developer-defined, organizer-approved metrics according to some embodiments.

FIG. 4 is a simplified diagram of a method 400 for controlling access to data using a set of metrics defined or otherwise selected by the developer entity, which metrics may be referred to herein as "developer-defined metrics" and which have been approved by the organizer entity. In some embodiments consistent with FIGS. 1-2, method 400 may be performed using a supervised learning system, such as supervised learning system 200. Like method 300, method 400 may be performed in conjunction with training and/or testing a machine learning (e.g. neural network model), such as models 120 and/or 240, associated with a third party developer, such as developer entity 110 as a second source, using labeled data, such as labeled data 130, 252, and/or 262, associated with an organizer and/or operator, such as organizer entity 140 as a first source. As before, the organizer entity may desire to control access to subset data, such as subset data 272, 274, and/or 276, associated with the labeled data and/or the trained model parameters by the third party developer entity. In comparison to method 300, method 400 may provide increased flexibility to the third party developer entity in defining the set of metrics that are generated when testing and/or training the neural network model.

At a process 410, instructions from the developer entity for generating one or more developer-defined metrics are analyzed by the organizer entity to identify any instructions that could result in a set of developer-defined metrics that include subset data. As described herein, it will be appreciated that such analysis may be carried out in preferred embodiments using automated techniques by the system 100, 200 described in FIGS. 1 and 2 and may include executing portions of the instructions or model 120, 240 respectively. For example, the source code provided by the third-party developer entity for training and/or testing the neural network model may be analyzed, where the source code may include the instructions for generating the developer-defined set of metrics. The organizer entity may determine a level of risk as to the likelihood that the developer-defined metrics may include subset data. The level of risk may be assessed quantitatively and/or qualitatively. Based on the level of risk, the organizer entity may determine whether or not to approve the developer-defined metrics (e.g., based on whether the level of risk exceeds a predetermined threshold) or require remedial action with respect to the set of metrics.

Upon a determination that the developer-defined metrics do not include the subset data (e.g., the level of risk is determined to be below a predetermined threshold), method 400 may proceed to processes 420-430 for transmitting the developer-defined metrics (as approved by the organizer entity) to the third party developer entity. Upon a determination that the developer-defined metrics include subset data (e.g., the level of risk is above the predetermined threshold), method 400 may proceed to a process 440 for taking a remedial action. Here is an embodiment which defines tests whether the developer-defined metrics should not have.

(1) Possibility of developer(s) abusing the system to collect information (This is an unknown risk to be considered).
(2) Possibility to obtain confidential data through indirect (statistical) information. The ability to infer the confidential data from the developer-defined metric will depend on the design of the metric and the statistical distribution of the confidential data (This possibility of this inference cannot be clearly determined so must be addressed as a risk-tolerance manner).
(3) Possibility the learning method when executed on a certain dataset would result in developer-metrics containing a subset of the data. One example is that the developer-metrics contain mean information of all example data in a given class. For certain datasets or training methods, the class may end up only containing 1 data point so that the data point itself would be extracted. Thus, the risk and uncertainty come from unknown interaction of the particular training set and the developer's model.

In some embodiments, one or more sets of developer-defined metrics may be approved, and one or more other sets of developer-defined metrics may not be approved at process 410. Consistent with such embodiments, method 400 may proceed to processes 420-430 with respect to one set of developer-defined metrics and may proceed to process 440 with respect to another set of developer-defined metrics.

At a process 420, the neural network model is trained and/or tested using the labeled data. For example, the training may be performed using supervised learning techniques. In some embodiments consistent with FIG. 3, process 420 may generally correspond to process 310. At a process 430, the developer-defined metrics (as approved by the organizer entity) associated with the training and/or testing are generated and transmitted to the third party developer entity as a set of developer metrics, such as developer metrics 282. Because, the developer-defined metrics are generated using instructions approved by the organizer entity, the organizer entity may prevent and/or limit the amount of the subset data included in the set of developer metrics.

At a process 440, one or more remedial actions are taken in a case where the developer-defined set of metrics includes subset data. In some embodiments, the remedial actions may include transmitting an error message to the third party developer entity and/or requesting that the third party developer entity modify the instructions to reduce the level of risk that the developer-defined set of metrics may have the subset data which have a possibility to obtain confidential data through indirect (statistical) information. Consistent with such embodiments, the third party developer entity may resubmit the modified instructions, in which case method 400 may return to process 410 to identify any modified instructions that could result in a set of developer-defined metrics that include subset data. In some embodiments, the remedial actions may include modifying (manually and/or automatically), by the organizer entity, the instructions to reduce the level of risk that the developer-defined metrics may include subset data. The organizer-modified instructions may be re-analyzed at process 410 to confirm that the level of risk is sufficiently reduced based on the modifications and/or may be executed at processes 420-430 to generate and send the developer-defined metrics as modified and approved by the organizer entity to the third party developer entity.

Figure 5:
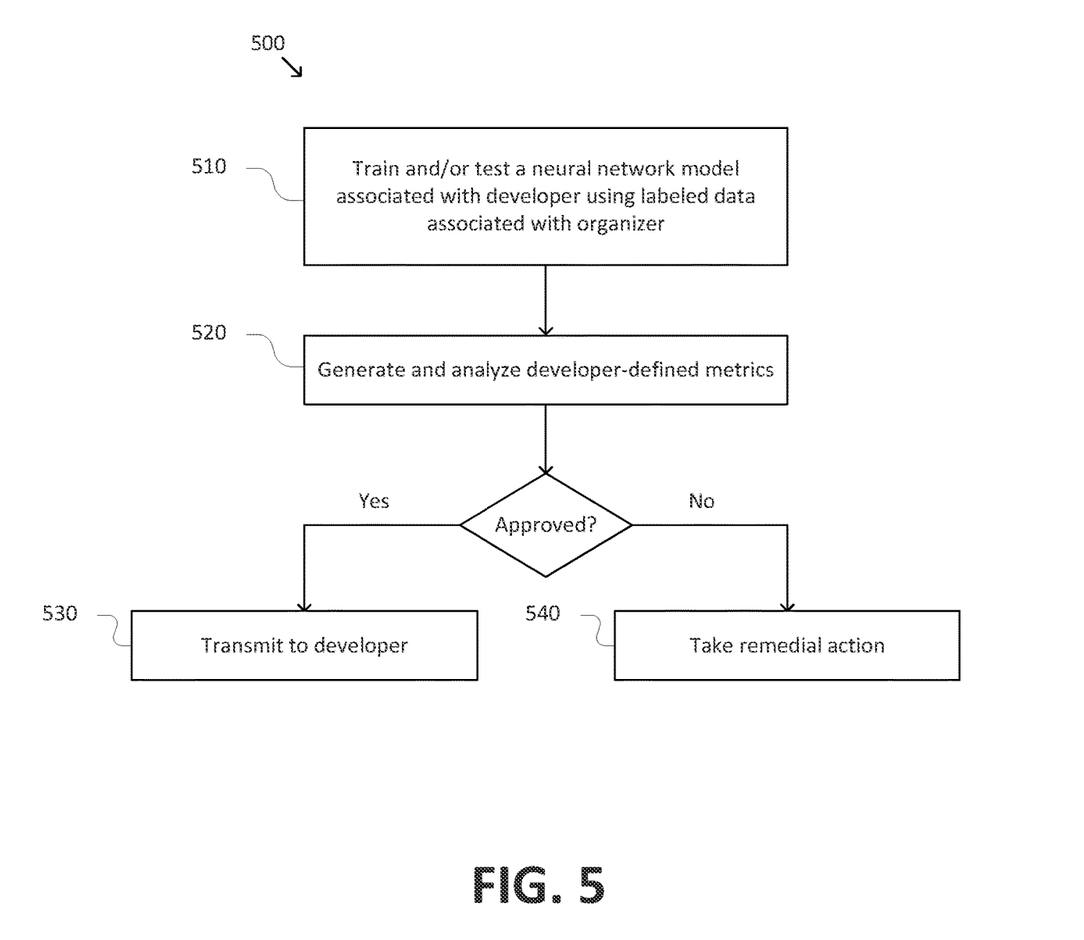
FIG. 5 is a simplified diagram of a method for controlling access to data by analyzing developer-defined metrics according to some embodiments.

FIG. 5 is a simplified diagram of a method 500 for controlling access to data by analyzing developer-defined metrics according to some embodiments. In some embodiments consistent with FIGS. 1-2, method 500 may be performed using a supervised learning system, such as supervised learning system 200. Like methods 300 and 400, method 500 may be performed in conjunction with training and/or testing a neural network model, such as models 120 and/or 240, associated with a third party developer, such as developer entity 110, using labeled data, such as labeled data 130, 252, and/or 262, associated with an organizer, such as organizer entity 140. As before, the organizer entity as the first source may desire to control access to subset data, such as subset data 272, 274, and/or 276, associated with the labeled data and/or the trained model parameters by the third party developer entity as the second source. In comparison to methods 300 and/or 400, method 500 may provide increased flexibility to the third party developer entity in defining the metrics that are generated when testing and/or training the neural network model. Moreover, method 500 may detect the subset data included in developer-defined metrics of other methods, such as method 400, may not identify.

At a process 510, the neural network model is trained and/or tested using the labeled data. For example, the training may be performed using supervised learning techniques. In some embodiments consistent with FIGS. 3-4, process 510 may generally correspond to processes 310 and/or 420.

At a process 520, developer-defined metrics associated with the training and/or testing are generated and analyzed by the organizer entity. In some embodiments, a set of developer-defined metrics may be generated by executing instructions provided by and/or configured by the third party developer entity. Because the set of metrics are developer-defined, they may include subset data to which the organizer entity desires to limit access, blocking or preventing the developer entity from receiving subset data. In some examples, the developer-defined metrics may include subset data even when the developer-defined metrics are organizer-approved, e.g., using method 400. Accordingly, the generated developer-defined metrics may be analyzed by the organizer entity, e.g., using automated techniques.

In some embodiments, analyzing the developer-defined metrics may include determining a level of overlap between the developer-defined metrics and subset data. In general, a wide range of techniques may be employed to determine the level of overlap. For example, the organizer entity may evaluate a hash function to generate a first set of one or more hash keys corresponding to subset data, and a second set of one or more hash keys corresponding to the developer-defined metrics. When a collision occurs, in which a given hash key is included in each of the first and second sets of hash keys, the level of overlap may be increased. In some embodiments, the hash function and/or the process of evaluating the hash function may be selected to reduce the sensitivity of the overlap determination to minor alterations to subset data. For example, the developer-defined metrics may include an altered version of subset data that is modified by noise, cropping, shifting, and/or the like, but retains the underlying meaning of subset data. Accordingly, determining the level of overlap may include performing statistical analysis of the developer-defined metrics to detect overlap even when there may not be an exact match.

In some embodiments, analyzing the developer-defined metrics may include determining the size (e.g., file size in bytes) of the developer-defined metrics. In general, complex decision-making tasks, such as those addressed using neural network models, involve large amounts of information. In turn, the number of learned parameters of the neural network model amounts to an even greater amount of information, providing sufficient entropy to handle the complexity of the task at hand (e.g., interrelationships among a set of features used as an input to the neural network model). Finally, the amount of labeled training data used to train the learned parameters is generally far greater than the number of learned parameters. Accordingly, a correlation may exist between the amount of information returned to the third party developer via the developer-defined metrics and the level of risk as to the likelihood that subset data may be included in the developer-defined metrics. For example, even when the developer defined metrics do not directly include labeled training data and/or learned parameters, with enough information and/or entropy, the developer-defined metrics may allow the third party developer to reconstruct subset data, especially when combined over multiple trials. The use of compression (e.g., reducing the size of developer-defined metrics by removing extraneous, low relevance, and/or duplicative information) may further increase the risk of disclosing subset data. Placing a maximum limit on the file size of the developer-defined metrics or maximum number of trials, restricts the amount of information that can be obtained by a developer in relation to the dataset.

In some embodiments, analyzing the developer-defined metrics may include identifying portions of the developer-defined metrics that are non-human-readable, encrypted, formatted in an unknown format, and/or the like. Because such portions of the developer-defined metrics may be unreadable to the organizer entity, there is an elevated level of risk that these portions may include subset data.

Based on the analysis, the developer-defined metrics may be approved and/or rejected. In some examples, the approval or rejection may be partial (e.g., a first portion of the developer-defined metrics may be approved, and a second portion may be rejected). In some embodiments, the developer-defined metrics may be rejected when the level of overlap with the labeled data exceeds a maximum level of overlap threshold. In some embodiments, the developer-defined metrics may be rejected when the size of the developer-defined metrics (e.g., the file size in bytes) exceeds a maximum size threshold. In some examples, the maximum size threshold may be determined dynamically based on an expected size of the developer-defined metrics. In this manner, the organizer entity may allow larger file sizes at later epochs of the supervised learning process, may accommodate certain types of metrics that may be larger than others, and/or the like. In some embodiments, the developer-defined metrics may be rejected when a combined risk score that aggregates multiple risk factors—such as the level of overlap, the file size, the presence of unreadable and/or encrypted portions, and/or the like—exceeds a predetermined threshold. In some embodiments, a hybrid approach may be used in which automatic techniques are used to identify developer-defined metrics with a high risk (e.g., a level of risk above a predetermined threshold), which are then submitted to a human reviewer for manual analysis.

Upon a determination that a first set of developer-defined metrics do not include subset data, method 500 may proceed to a process 530 for transmitting the approved, developer-defined first set of metrics to the third party developer entity. Upon a determination that the developer-defined first set of metrics are rejected in concern with the reasons depicted in above ([0057]), method 500 may proceed to a process 540 for implementing a remedial action. In embodiments consistent with FIG. 4, process 540 may generally correspond to process 440. For example, the remedial actions may include transmitting an error message to the third party developer entity and/or requesting that the third party developer entity modify the instructions to reduce the level of risk that the developer-defined metrics may include subset data. In some embodiments, the remedial actions may include modifying (manually and/or automatically), by the organizer entity, the instructions for generating the developer-defined metrics and/or modifying the developer-defined metrics themselves to remove and/or obfuscate subset data, thereby generating a second set of cleansed metrics that may be transmitted to the third party developer entity. In some embodiments, the remedial actions may include blocking the third party developer entity from receiving developer-defined metrics. The blocking may occur after a predetermined number of violations and/or attempts to access subset data (e.g., three violations). In some embodiments, records of attempts to access subset data may be provided to the organizer entity and/or to the third party developer entity for tracking purposes.

It is to be understood that methods 300-500 may be combined to provide multiple layers of access control. For example, a supervised learning system may allow third party developers to obtain feedback on their models by (a) selecting among one or more organizer-defined metrics, consistent with method 300, and/or (b) providing instructions to generate one or more developer-defined metrics, subject to organizer entity approval consistent with method 400 and/or organizer analysis consistent with method 500.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A system for controlling access to subset data, the system comprising:
  a non-transitory memory; and
  at least one hardware processor coupled to the non-transitory memory and configured to read instructions from the non-transitory memory to cause the system to perform operations comprising:
    providing labeled training data from a first source;
    receiving, by the first source, a machine learning program from a second source different from the first source;
    blocking, by the first source, access by the second source to the labeled training data;
    training, by the first source, the machine learning program according to a supervised machine learning process using the labeled training data;
    generating a first set of metrics from the supervised machine learning process that provide feedback about training of the machine learning program;
    analyzing the first set of metrics to identify subset data therein, wherein the subset data is selected from the group consisting of the labeled training data, derived data that is indicative of the labeled training data, data indicative of the supervised machine learning process, information usable to produce equivalent training results to the labeled training data, at least one learned parameter of the machine learning program, and metadata associated with the labeled training data; and
    in order to permit evaluation of the machine learning program, transmitting, to the second source, those metrics from the first set of metrics that do not include the subset data.

2. The system of claim 1, wherein the operations further comprise, in response to the second source utilizing the transmitted metrics to revise the machine learning program, training, by the first source, the revised machine learning program according to the supervised machine learning process using the labeled training data.

3. The system of claim 1, wherein the operations further comprise generating a second set of metrics from the supervised machine learning process that provide feedback about testing of the machine learning program.

4. The system of claim 1, wherein the operations further comprise generating a second set of metrics and transmitting the second set of metrics to the second source in response to an identification of the subset data within the first set of metrics, wherein the second set of metrics does not include the subset data.

5. The system of claim 1, wherein identifying the subset data includes identifying at least one portion of the first set of metrics that is non-human-readable, encrypted, or formatted in an unknown format.

6. The system of claim 1, wherein identifying the subset data includes determining a level of overlap between the first set of metrics and the subset data.

7. The system of claim 6, wherein the level of overlap is determined by detecting hash collisions between the first set of metrics and the subset data.

8. The system of claim 1, wherein identifying the subset data includes determining a file size of the first set of metrics.

9. The system of claim 1, wherein the operations further comprise generating a second set of metrics based on the training, wherein the second set of metrics are transmitted to the second source without analysis to identify the subset data therein.

10. The system of claim 1, wherein the operations further comprise receiving, by the first source from the second source, a set of instructions for generating the first set of metrics, and analyzing the set of instructions to determine a level of risk as to whether the first set of metrics will include the subset data.

11. The system of claim 1, wherein the operations further comprise:
   testing the machine learning program using labeled testing data associated with the first source;
   generating a second set of metrics associated with the testing;
   analyzing the second set of metrics to identify the subset data therein; and
   in order to permit evaluation of the machine learning program, transmitting, to the second source, those metrics from the second set of metrics that do not include the subset data.

12. A method for evaluating an external machine learning program while limiting access to internal training data, the method comprising:
   providing labeled training data from a first source;
   receiving, by the first source, a machine learning program from a second source different from the first source;
   blocking, by the first source, access by the second source to the labeled training data;
   training, by the first source, the machine learning program according to a supervised machine learning process using the labeled training data;
   generating a first set of metrics from the supervised machine learning process that provide feedback about training of the machine learning program;
   analyzing the first set of metrics to identify subset data therein, wherein the subset data is selected from the group consisting of the labeled training data, derived data that is indicative of the labeled training data, data indicative of the supervised machine learning process, information usable to produce equivalent training results to the labeled training data, at least one learned parameter of the machine learning program, and metadata associated with the labeled training data; and
   in order to permit evaluation of the machine learning program, transmitting, to the second source, those metrics from the first set of metrics that do not include the subset data.

13. The method of claim 12, further comprising utilizing the transmitted metrics to revise the machine learning program, and thereafter, training, by the first source, the revised neural network model according to the supervised machine learning process using the labeled training data.

14. The method of claim 12, further comprising generating a second set of metrics from the supervised machine learning process that provide feedback about testing of the machine learning program.

15. The method of claim 12, further comprising generating a second set of metrics and transmitting the second set of metrics to the second source in response to an identification of the subset data within the first set of metrics, wherein the second set of metrics does not include the subset data.

16. The method of claim 12, wherein identifying the subset data includes identifying at least one portion of the first set of metrics that is non-human-readable, encrypted, or formatted in an unknown format.

17. The method of claim 12, wherein identifying the subset data includes determining a level of overlap between the first set of metrics and the subset data.

18. The method of claim 17, wherein the level of overlap is determined by detecting hash collisions between the first set of metrics and the subset data.

19. The method of claim 12, wherein identifying the subset data includes determining a file size of the first set of metrics.

20. The method of claim 12, further comprising generating a second set of metrics based on the training, wherein the second set of metrics are transmitted to the second source without analysis to identify the subset data therein.

21. The method of claim 12, further comprising receiving, by the first source from the second source, a set of instructions for generating the first set of metrics, and analyzing the set of instructions to determine a level of risk as to whether the first set of metrics will include the subset data.

22. The method of claim 12, further comprising:
   testing the machine learning program using labeled testing data associated with the first source;
   generating a second set of metrics associated with the testing;
   analyzing the second set of metrics to identify the subset data therein; and
   in order to permit evaluation of the machine learning program, transmitting, to the second source, those metrics from the second set of metrics that do not include the subset data.

23. A non-transitory machine-readable storage medium having stored thereon instructions that, when executed by at least one hardware processor of a system, cause the system to perform operations comprising:
   training a machine learning program associated with a developer entity according to a supervised machine learning process using labeled training data associated with an organizer entity;
   generating a first set of metrics associated with the training;
   analyzing the first set of metrics to identify subset data therein, wherein the subset data is selected from the group consisting of the labeled training data, derived data that is indicative of the labeled training data, data indicative of the supervised machine learning process, information usable to produce equivalent training results to the labeled training data, at least one learned parameter of the machine learning program, and metadata associated with the labeled training data; and
   in order to permit evaluation of the machine learning program, transmitting, to the developer entity, those metrics from the first set of metrics that do not include the subset data.

24. The non-transitory machine-readable storage medium of claim 23, wherein the analyzing includes determining a file size of the first set of metrics.

25. The non-transitory machine-readable storage medium of claim 23, wherein the operations further comprise receiving, by the organizer entity from the developer entity, a set of instructions for generating the first set of metrics, and analyzing the set of instructions to determine a level of risk as to whether the first set of metrics will include the subset data.

* * * * *